US 6,569,970 B2

(12) United States Patent
Reck et al.

(10) Patent No.: US 6,569,970 B2
(45) Date of Patent: May 27, 2003

(54) AQUEOUS (METH)ACRYLATE POLYMER DISPERSION

(75) Inventors: Bernd Reck, Grünstadt (DE); Gernot Franzmann, Bobenheim (DE); Bertold Bechert, Grünstadt (DE); Reinhard Bäecher, Bad Düerkheim (DE); Gerd Rehmer, Beindersheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/910,847

(22) Filed: Jul. 24, 2001

(65) Prior Publication Data

US 2002/0007005 A1 Jan. 17, 2002

Related U.S. Application Data

(62) Division of application No. 08/930,576, filed as application No. PCT/EP96/01481 on Apr. 4, 1996, now Pat. No. 6,306,460.

(30) Foreign Application Priority Data

Apr. 15, 1995 (DE) .......................................... 195 14 266

(51) Int. Cl.⁷ .......................... C08F 130/04; C08F 20/10
(52) U.S. Cl. .................... 526/240; 526/287; 526/307.7; 526/318.4
(58) Field of Search .............................. 526/318.4, 287, 526/240, 307.7

(56) References Cited

U.S. PATENT DOCUMENTS

| | | |
|---|---|---|
| 3,043,790 A | 7/1962 | Sanders |
| 3,196,122 A | 7/1965 | Evans |
| 3,239,479 A | 3/1966 | Roenicke et al. |
| 3,617,368 A | 11/1971 | Gibbs et al. |
| 3,637,432 A | 1/1972 | Gibbs et al. |
| 4,012,560 A | 3/1977 | Baatz et al. |
| 4,340,510 A | 7/1982 | Howanietz et al. |
| 4,373,056 A * | 2/1983 | Besecke ............... 524/547 |
| 4,558,092 A * | 12/1985 | Reinecke ............... 524/817 |
| 4,999,218 A | 3/1991 | Rehmer et al. |
| 5,047,295 A | 9/1991 | Dotzauer et al. |
| 5,512,629 A | 4/1996 | Beckerle et al. |
| 5,895,688 A | 4/1999 | Bertoncini et al. |

FOREIGN PATENT DOCUMENTS

| | | |
|---|---|---|
| CA | 2001816 | 4/1991 |
| CA | 2123377 | 11/1994 |
| CH | 446 720 | 3/1968 |
| DE | 1 932 395 | 6/1970 |
| DE | 2 164 256 | 6/1973 |
| DE | 25 24 064 | 12/1975 |
| DE | 38 27 975 | 3/1990 |
| DE | 39 01 073 | 7/1990 |
| DE | 43 17 035 | 11/1994 |
| DE | 43 17 036 | 11/1994 |
| EP | 0 048 320 | 3/1982 |
| EP | 0 095 695 | 12/1983 |
| EP | 0 368 226 | 5/1990 |
| GB | 741654 | * 12/1955 |
| GB | 1 411 268 | 10/1975 |
| GB | 1 505 558 | 3/1978 |
| JP | 55-44273 | 11/1980 |

OTHER PUBLICATIONS

Tani, Oct. 14, 1989, JO 3131–533–A, 91–210625/29.
Derwent Abstracts, Accession No. 87–083489/12, JP 62–034947, Feb. 14, 1987.

* cited by examiner

*Primary Examiner*—David W. Wu
*Assistant Examiner*—Robert D. Harlan
(74) *Attorney, Agent, or Firm*—Oblon, Spivak, McClelland, Maier & Neustadt, P.C.

(57) ABSTRACT

In a process for preserving a mineral molding by coating the surface of the mineral molding with an aqueous composition comprising an aqueous polymer dispersion, the dispersed polymer P comprises an ethylenically unsaturated acid of the 2-acrylamido-2-methylpropanesulfonic acid type polymerized into it in free-radically polymerized form.

3 Claims, No Drawings

AQUEOUS (METH)ACRYLATE POLYMER DISPERSION

This patent application is a divisional of U.S. Pat. No. 08/930,576 filed Oct. 15, 1997 now U.S. Pat. No. 6,306,460.

BACKGROUND OF THE INVENTION

1. Field of the Invention

The present invention relates to a process for preserving a mineral molding by coating the surface of the mineral molding with an aqueous composition comprising an aqueous polymer dispersion whose dispersed polymer P comprises at least one ethylenically unsaturated acid and/or its conjugate base polymerized into it in free-radically polymerized form.

The present invention further relates to the mineral molding preserved according to the invention and to the aqueous polymer dispersion required for preservation according to the invention.

2. Description of the Background

In this document, a mineral molding is a molding produced from a mixture (a mortar) of a mineral binder, water, aggregates and, if desired, auxiliaries by, after shaping, the mineral binder/water mixture curing as a function of time, if desired under the action of elevated temperature. Mineral binders are generally known. They are finely divided inorganic materials such as lime, gypsum, clay and/or cement which are converted by mixing with water into their ready-to-use form, with the latter solidifying like stone as a function of time when left, in air or even under water, if desired under the action of elevated temperature.

The aggregates generally comprise granular or fibrous natural or synthetic rock (gravel, sand, mineral fibers), in special cases even of metal or organic aggregates or mixtures of the specified aggregates, having grain sizes or fiber lengths which are matched to the respective application in a manner known per se. Frequently, colored pigments are concomitantly used as aggregates for the purpose of imparting color.

Suitable auxiliaries are, in particular, those substances which accelerate or retard curing or influence the elasticity or porosity of the solidified mineral molding. These are, in particular, polymers as are known, for example, from U.S. Pat. No. 4,340,510, GB-B 15 05 558, U.S. Pat. No. 3,196,122, U.S. Pat. No. 3,043,790, U.S. Pat. No. 3,239,479, DE-A 43 17 035, DE-A 43 17 036, JP-A 91/131 533 and other documents.

Examples of the mineral moldings to be preserved according to the invention are concrete pipes as are used for the transport of sewage (cf., for example JP-A 55/44 273), concrete roofing tiles (cf., for example DE-A 21 64 256 or DE-A 39 01 073) or curb-stone, steps of stairways, floor slabs or baseplates on the basis of mineral binders.

A disadvantage of mineral moldings is that under the action of weathering (in particular the action of water) the cationic constituents such as $Ca^{2+}$ are leached out over the course of time, which reduces their strength. A further drawback of mineral moldings is the occurrence of efflorescence. This is presumably attributable to the fact that the mineral binders contain polyvalent cations such as $Ca^{2+}$ in an alkaline environment. Reaction with the carbon dioxide of the air can thus form sparingly water-soluble, ugly white lime spots on the surface of the mineral molding. The appearance of efflorescence can occur both during the curing of freshly prepared mineral moldings and also after the action of weathering on previously cured mineral moldings.

Attempts have long been made to counter the abovementioned draw-backs by sealing the mineral molding on its surface by application of a suitable coating.

Attempts were first made to preserve mineral moldings by coating with surface coatings based on vinyl chloride copolymers in organic solvents.

A disadvantage of this procedure is that it can be used only for dry mineral moldings since, on mineral moldings which are still moist, the adhesion of the surface coating is poor and, in addition, porous films are formed.

The abovementioned disadvantages of the organic surface coatings were relatively quickly overcome by sealing the surface of the mineral moldings by coating with aqueous compositions containing an aqueous polymer dispersion as film-former.

Dispersion polymers recommended for this purpose were styrene-acrylic ester copolymers, styrene-butadiene copolymers, homo-polymers and, in particular, copolymers or terpolymers of vinyl acetate with olefins, vinyl halides and/or (meth)acrylic esters, homopolymers or copolymers of vinyl propionate, (meth)acrylic ester homopolymers or copolymers, etc. (cf., for example DE-A 21 64 256, page 4).

However, the resulting coatings were not satisfactorily able to prevent the cationic constituents passing through. The Swiss Patent 446 720 recommends as a remedy the addition to the aqueous polymer dispersions of water-soluble salts or acids which form sparingly soluble salts with the cations of the mineral binders.

However, the action of these additives is limited since they are, for example, washed by rain from the films of the aqueous polymer dispersions as a function of time and thus only short-term protection is provided.

DE-A 39 01 073 and DE-A 38 27 975 recommend the preservation of mineral moldings by coating the corresponding surfaces with an aqueous composition containing as binder an aqueous polymer dispersion whose dispersed polymer contains from 0.5 to 5% by weight of at least one of the monomers acrylic acid, methacrylic acid, vinylsulfonic acid, itaconic acid, crotonic acid, maleic acid and fumaric acid in free-radically copolymerized form.

A disadvantage of these coatings of mineral moldings is that their preservative action is not completely satisfactory.

It is an object of the present invention to provide an improved process for preserving a mineral molding, which does not have the disadvantages of the processes of the prior art.

SUMMARY OF THE INVENTION

We have found that this object is achieved by a process for preserving a mineral molding by coating the surface of the mineral molding with an aqueous composition which comprises an aqueous polymer dispersion whose dispersed polymer P comprises at least one ethylenically unsaturated acid and/or its conjugate base polymerized into it in free-radically polymerized form, wherein the polymer P of the aqueous polymer dispersion comprises at least one monomer of the general formula I

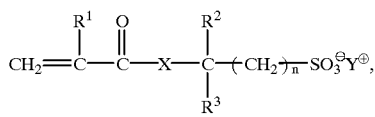

(I)

where the variables have the following meanings:
n is 0 to 2,
$R^1, R^2, R^3$ are, independently of one another, hydrogen or methyl,
X is oxygen or imino (NH) and
Y is hydrogen, alkali metal or ammonium,
polymerized into it in free-radically polymerized form.

Aqueous polymer dispersions whose dispersed polymer comprises at least one monomer of the general formula I polymerized into it in free-radically polymerized form are known and previously described, for example, in DE-A 25 24 064 where their films are recommended as pressure-sensitive adhesives. EP-B 95 695 recommends the use of aqueous polymer dispersions comprising at least one monomer of the general formula I polymerized into them in free-radically polymerized form for modifying hydraulically setting compositions. The same applies to EP-A 368 226. DE-B 19 32 395 recommends aqueous polymer dispersions comprising monomers of the general formula I polymerized into them in free-radically polymerized form for coating substrates different from mineral moldings.

DETAILED DESCRIPTION OF THE PREFERRED EMBODIMENTS

Monomers of the general formula I which are favorable according to the invention are:

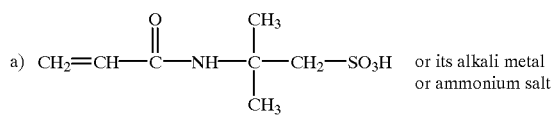

(2-Acrylamido-2-methylpropanesulfonic acid)

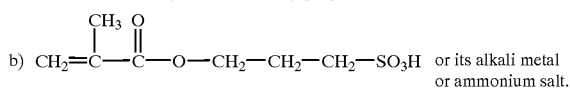

(3-Sulfopropyl methacrylate)

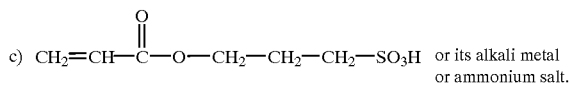

(3-Sulfopropyl acrylate)

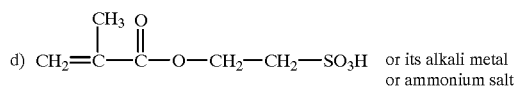

(2-Sulfoethyl methacrylate)

Particularly suitable alkali metal salts of the monomers of the general formula I are the sodium and potassium salts.

Advantageously, the dispersed polymer P of the aqueous polymer dispersion to be used according to the invention contains, based on its weight, from 0.5 to 5, preferably from 0.5 to 2, particularly preferably from 0.5 to 1.5 and very from 0.5 to 1, % by weight of at least one monomer of the general formula I polymerized into it in free-radically polymerized form.

The polymer P to be used according to the invention is advantageously prepared by the method of free-radical polymerization, where suitable comonomers for the at least one monomer of the general formula I are monomers which are different from this and have at least one ethylenically unsaturated group. Suitable monomers of this type are, for example, olefins such as ethylene, vinylaromatic monomers such as styrene, α-methylstyrene, o-chlorostyrene or vinyltoluenes, esters of vinyl alcohol and mono-carboxylic acids having from 1 to 18 carbon atoms such as vinyl acetate, vinyl propionate, vinyl n-butyrate, vinyl laurate, vinyl pivalate and vinyl stearate as well as commercially available monomers VEOVA®9–11 (VEOVA X is a tradename of the Shell Company and denotes vinyl esters of carboxylic acids which can also be designated as Versatic® X acids), esters of α,β-monoethylenically unsaturated monocarboxylic and dicarboxylic acids preferably having from 3 to 6 carbon atoms, in particular acrylic acid, methacrylic acid, maleic acid, fumaric acid and itaconic acid, with alkanols generally having from 1 to 12, preferably from 1 to 8 and in particular from 1 to 4, carbon atoms, in particular methyl, ethyl, n-butyl, iso-butyl, tert-butyl and 2-ethylhexyl esters of acrylic acid and methacrylic acid, dimethyl maleate or n-butyl maleate, nitriles of α,β monoethylenically unsaturated carboxylic acids such as acrylonitrile and also $C_{4-8}$-conjugated dienes such as 1,3-butadiene and isoprene. The specified monomers are generally the main monomers which, based on the total weight of the monomers to be polymerized, are normally present in an amount of at least 90% by weight. As a rule, these monomers have only a slight solubility in water under normal conditions (25° C., 1 atm).

Monomers which have increased water-solubility under the above conditions are, for example, α,β-monoethylenically unsaturated monocarboxylic and dicarboxylic acids and their amides, for example acrylic acid, methacrylic acid, maleic acid, fumaric acid, itaconic acid, acrylamide and methacrylamide, also vinylsulfonic acid and their water-soluble salts as well as N-vinylpyrrolidone. Of course, the alkali metal salts or the ammonium salts of the abovementioned acids are also possible as monomers, in particular their sodium and potassium salts. These monomers which have a higher water solubility are normally polymerized into the polymer P only in such amounts that their amount together with the amount of the monomers of the general formula I to be polymerized in, based on the total amount of the monomers to be polymerized, does not excess 10% by weight, preferably 5% by weight. Higher contents of these monomers generally reduce the water resistance of the preservative coating of the invention.

Monomers which customarily increase the internal strength of films formed from aqueous polymer dispersions normally have at least one epoxy, hydroxy, N-methylol or carbonyl group or at least two nonconjugated ethylenically unsaturated double bonds. Examples of these are N-alkylolamides of α,β-monoethylenically unsaturated carboxylic acids having from 3 to 10 carbon atoms also their esters with alkanols having from 1 to 4 carbon atoms, among which N-methylolacrylamide and N-methylolmethacrylamide are very particularly preferred, monomers containing two vinyl radicals, monomers containing two vinylidene radicals and monomers containing two alkenyl radicals. Particularly advantageous compounds of this type are the diesters of dihydric alcohols with α,β-monoethylenically unsaturated monocarboxylic acids among which acrylic and methacrylic acids are preferred. Examples of such monomers containing two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the $C_{1-8}$-hydroxyalkyl esters of methacrylic acid and acrylic acid such as n-hydroxyethyl, n-hydroxypropyl or n-hydroxybutyl acrylate and methacrylate and also compounds such diacetoneacrylamide and acethylacetoxyethyl acrylate or methacrylate, ureidoethyl methacrylate and acrylamidoglycolic acid. If desired, use can also be made as copolymers of ethylenically unsaturated monomers which are derivatives of benzophenone or acetophenone and increase the internal strength of films formed from aqueous polymer dispersions under the action of electromagnetic radiation. Based on the total amount of monomers to be polymerized, the above monomers which increase the internal strength are usually copolymerized in an amount of up to 10% by weight, preferably up to 5% by weight.

The films formed from the resulting aqueous polymer dispersions generally have a reduced tendency to soiling.

Further active monomers which can be copolymerized are, for example, based on the total amount of the monomers to be polymerized, up to 5% by weight, preferably up to 2% by weight, of ethylenically unsaturated organotin compounds as are described in DE-A 39 01 073. The films resulting therefrom incorporate a biocide and exhibit, for example, reduced algal growth.

Favorable monomer compositions for preparing polymers P of the invention include, besides from 0.5 to 5% by weight of monomers of the general formula I, generally from 70 to 99.5% by weight of esters of acrylic and/or methacrylic acid with alkanols having from 1 to 12 carbon a and/or styrene or from 70 to 99.5% by weight of styrene and/or butadiene, or from 70 to 99.5% by weight of vinyl chloride and/or vinylidene chloride, or from 40 to 99.5% by weight of vinyl acetate, vinyl propionate and/or ethylene.

Of particular relevance to the process of the invention for preparing polymers P are monomer compositions comprising:

from 90 to 99.5% by weight of esters of acrylic and/or methacrylic acid with alkanols having from 1 to 12 carbon atoms and/or styrene, from 0.5 to 5% by weight of at least one monomer of the general formula I and from 0 to 5% by weight of one or more monomers from the group encompassing α,β-monoethylenically unsaturated carboxylic acids having from 3 to 6 carbon atoms, their alkali metal salts, their ammonium salt and their amide; or from 90 to 99.5% by weight of styrene and/or butadiene, from 0.5 to 5% by weight of at least one monomer of the general formula I and from 0 to 5% by weight of one or more monomers from the group encompassing α,β-monoethylenically unsaturated carboxylic acids having from 3 to 6 carbon atoms, their alkali metal salts, their ammonium salt their amide; or from 90 to 99.5% by weight of vinyl chloride and/or vinylidene chloride, from 0.5 to 5% by weight of at least one monomer of the general formula I and from 0 to 5% by weight of one or more monomers from the group encompassing α,β-monoethylenically unsaturated carboxylic acids having from 3 to 6 carbon atoms, their alkali metal salts, their ammonium salt their amide; or from 90 to 99.5% by weight of vinyl acetate, vinyl propionate and/or ethylene, from 0.5 to 5% by weight of at least one monomer of the general formula I and from 0 to 5% by weight of one or more monomers from the group encompassing α,β-monoethylenically unsaturated carboxylic acids having from 3 to 6 carbon atoms, their alkali metal salts, their ammonium salt and their amide.

A further favorable monomer composition for the polymer P is one comprising from 90 to 99.5% by weight of at least one monomer from the group encompassing esters of acrylic acid with alkanols having from 1 to 8 carbon atoms, esters of methacrylic acid with alkanols having from 1 to 8 carbon atoms, styrene, α-methylstyrene, o-chlorostyrene and vinyltoluenes, from 0.5 to 5% by weight of at least one monomer of the general formula I and from 0 to 5% by weight of one or more monomers from the group encompassing acrylic acid, methacrylic acid, itaconic acid, the alkali metal salts of these, the ammonium salts of these, acrylamide and methacrylamide.

Among these monomer compositions, preference is given to those which include no vinylaromatic monomers.

Furthermore, the abovementioned monomer compositions all advantageously include from 0.5 to 2, better 0.5 to 1.5 and p advantageously from 0.5 to 1, % by weight of monomers of the general formula I, among which 2-acrylamido-2-methylpropanesulfonic acid, its alkali metal salt and/or its ammonium salt are preferably used.

According to Ullmanns Encyclopadie der technischen Chemie, Vol. 19, 4th Edition, Verlag Chemie, Weinheim (1980) p. 17/18, an aqueous polymer dispersion results in formation of a polymer film suitable for the application only when the minimum film formation temperature of the aqueous polymer dispersion is below the use temperature. The minimum film formation temperature of an aqueous polymer dispersion can be influenced in a manner known per se to those skilled in the art, for example by adding low-volatility external plasticizers such as esters of phthalic acid and/or readily volatile film-forming auxiliaries such as low boiling organic solvents to the aqueous polymer dispersion, with a combination of external plasticizers sparingly soluble in water at 25° C. and foam-forming auxiliaries readily soluble in water at 25° C. being found to be particularly advantageous for film formation. Suitable examples of relatively volatile film-forming auxiliaries are: ethylene glycol, 1,2-propanediol, glycerol and other aliphatic polyalcohols, ethylene glycol monoethyl ether, ethylene glycol monobutyl ether, ethylene glycol hexyl ether, diethylene glycol monomethyl ether, diethylene glycol monopropyl ether, diethylene glycol monobutyl ether, dipropylene glycol methyl ether, dipropylene glycol n-butyl ether, propylene glycol t-butyl ether, tripropylene glycol methyl ether and other aliphatic glycol ethers, ethylene glycol monoethyl ether acetate, diethylene glycol monobutyl ether acetate, propylene glycol monomethyl ether acetate and other esters of aliphatic glycol ethers, diisobutyl adipate, diisobutyl succinate, diisobutyl glutarate, diisobutyl maleate and other diesters of aliphatic dicarboxylic acids, and white spirit.

Suitable examples of low-volatility external plasticizers are: dimethyl phthalate, dibutyl phthalate, dioctyl phthalate and other esters of phthalic acid, 2,2,2-trimethyl-1,3-pentanediol monoisobutyrate, propoxylated m-cresol having a number average degree of propoxylation of 6, propoxylated p-cresol having a number average degree of propoxylation of 6 and also mixtures of these two oligo(propylene glycol) cresol ethers, oligo(propylene glycol) cresol ethers having a number average degree of propoxylation of 3, oligo(propylene glycol) cresol ethers having a number average degree of propoxylation of 12 and also oligo(propylene glycol) phenyl ethers and oligo(propylene glycol) alkylphenyl ethers having a number average degree of propoxylation of from 3 to 12, aromatic glycol ethers, ethyl p-toluenesulfonate, alkyl esters of aromatic sulfonic acids, tributoxyethyl phosphate, tri-n-butyl phosphate and other phosphoric esters.

Of course, the transition from film-forming auxiliaries to external plasticizers is gradual.

However, preference is given to using the principle of internal plasticization (which can of course also be used in combination with external plasticization), ie. the composition is chosen within the abovementioned range of possible monomer compositions in such a way that the static glass transition temperature of the polymer P corresponds essentially to the required minimum film formation temperature. For the present purpose, static glass transition temperature $T_g$ is the midpoint temperature in accordance with ASTM D 3418-82, determined by differential scanning colorimetry DSC (cf. also Ullmann's Encyclopedia of Industrial Chemistry, VCH Weinheim (1992), p. 169 and Zosel, Farbe und Lack 82 (1976), pp. 125–134).

According to Fox (T. G. Fox, Bull. Am. Phys. Soc. (Ser.II) 1, 123[1956]) and according to Ullmanns Encyclopädie der technischen Chemie, Vol. 19, 4 th Edition, Verlag Chemie, Weinheim (1980), p. 18, the static glass transition temperature of at most weakly crosslinking copolymers is given in good approximation by:

$$\frac{1}{T_g} = \frac{X^1}{T_g^1} + \frac{X^2}{T_g^2} + \dots \frac{X^n}{T_g^n},$$

where $X^1, X^2, \ldots, X^n$ are the mass fractions of the monomers 1, 2, ..., n and $T_g^1, T_g^2, \ldots, T_g^n$ are the static glass transition temperatures in degrees Kelvin of the respective polymers made up of only one of the monomers monomeren 1, 2, . . . , n. The static glass transition temperatures of these homopolymers of most ethylenically unsaturated monomers are known (or can be experimentally determined in a simple manner known per se) and given in, for example, J. Brandrup, E. H. Immergut, Polymer Handbook $1^{st}$ Ed., J. Wiley, New York 1966, $2^{nd}$ Ed., J. Wiley, New York 1975, and $3^{rd}$ Ed., J. Wiley, New York, 1989, and also in Ullmann's Encyclopedia of Industrial Chemisty, VCH Weinheim (1992), p. 169. The static glass transition temperature also enables the freezing-thawing resistance of the preservative coatings of the invention to be influenced in a manner known per se to those skilled in the art.

The static glass transition temperature of the films formed from the aqueous dispersions of the polymers P to be used according to the invention is preferably from –10 to +50° C., particularly from +10 to +40° C. and very particularly preferably from >+20 to +30° C.

Accordingly, the monomer composition of the polymer P to be used according to the invention advantageously comprises from 40 to 60% by weight of methyl methacrylate (monomer a)

from 40 to 60% by weight of n-butyl acrylate and/or 2-ethylhexyl acrylate (monomer b), from 0.5 to 5% by weight of at least one monomer of the general formula I (monomer c) and from 0.5 to 5% by weight of at least one monomer from the group encompassing acrylic acid, methacrylic acid, itaconic acid, the alkali metal salts of these, the ammonium salts of these, acrylamide and methacrylamide (monomer d).

The total amount of monomers c and d is here preferably ≦6% by weight, particularly preferably ≦3% by weight, based on the total monomer composition.

The polymer P is advantageously prepared from the monomers having at least one monoethylenically unsaturated group by the method of free-radical aqueous emulsion polymerization, ie. generally dispersed directly in the aqueous medium in the presence of free-radical polymerization initiators and of dispersants (although the aqueous dispersion of the polymer P to be used according to the invention can also be a secondary dispersion; the preparation of secondary dispersions is described, for example, in EP-A 320 865).

This method of preparation has previously been described many times and is therefore sufficiently known to those skilled in the art (cf., for example Encyclopedia of Polymer Science und Engineering, Vol. 8 (1987) p. 659 ff; D. C. Blackley, in High Polymer Latices, Vol. 1,(1966), p. 35 ff; H. Warson, The Applications of Synthetic Resin Emulsions, Chapter 5 (1972), page 246 ff; D. Diederich, Chemie in unserer Zeit 24, (1990), pp. 135–142; Emulsion Polymerization, Interscience Publishers, New York (1965); DE-A 40 03 422 and Dispersionen synthetischer Hochpolymerer, F. Hölscher, Springer-Verlag, Berlin (1969)).

The size of the polymer particles dispersed in the aqueous polymer dispersion, ie. their diameter, is determined in a manner known per se to those skilled in the art, in particular by the type and amount of dispersant used. In general, increasing amount of dispersant is associated with a decreasing polymer particle diameter. The diameters of the dispersed polymer particles are usually in the range from 10 to 5000 mm, often mainly in the range from 10 to 1000 nm.

The number average diameter of the aqueous polymer dispersion to be used for the purposes of the process of the invention is advantageously from 80 to 400 nm, preferably from 100 to 300 nm and particularly preferably from 150 to 250 nm.

The frequency distribution of the polymer particle diameter is particularly advantageously multimodal, ie. it has more than one maximum. The number of maxima is preferably 2, 3 or 4 (determined by means of capillary hydrodynamic fractionation (CHDF) as described in J. of Colloid and Interface Science, Vol. 135, p. 165–177 (1990)).

Suitable dispersants are both emulsifiers and the protective colloids customarily used for carrying out free-radical aqueous emulsion polymerization.

Suitable protective colloids are, for example, polyvinyl alcohols, cellulose derivatives or copolymers containing vinylpyrrolidone. A detailed description of further suitable protective colloids is given in Houben-Weyl, Methoden der organischen Chemie, Volume XIV/1, Makromolekulare Stoffe, Georg-Thieme-Ver-lag, Stuttgart, 1961, pp. 411–420. Of course, it is also possible to use mixtures of emulsifiers and/or protective colloids. Preferably, the dispersants used are exclusively emulsifiers whose relative molecular weights are, unlike the protective colloids, usually below 2000, frequently below 1000. They can be anionic, cationic or nonionic in nature. Of course, if mixtures of surface-active substances are used, the individual components have to be compatible with one another, which, in case of doubt, can be checked by means of a few preliminary experiments. In general, anionic emulsifiers are compatible with one another and with nonionic emulsifiers. The same applies to cationic emulsifiers, while anionic and cationic emulsifiers are usually incompatible with one another. Emulsifiers which can be used are, for example, ethoxylated mono-, di- and trialkylphenols (degree of ethoxylation: from 3 to 100, alkyl radical: $C_4$ to $C_{12}$), ethoxylated alcohols (degree of ethoxylation: from 3 to 100, alkyl radical: $C_8$ to $C_{18}$), and also alkali metal and ammonium salts of alkyl sulfates (alkyl radical: $C_8$ to $C_{16}$), of sulfuric acid monoesters or phosphoric acid monoesters of ethoxylated alcohols (degree of ethoxylation: from 1 to 70, alkyl radical: $C_{12}$ to $C_{18}$) and ethoxylated alkylphenols (degree of ethoxylation: from 3 to 100, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers such as sulfosuccinic esters are given in Houben-Weyl, Methoden der organischen Chemie, Volume XIV/1, Makromolekulare Stoffe, Georg-Thieme Verlag, Stuttgart, 1961, pages 192–208.

Other surface-active substances which have been found to be suitable are compounds of the general formula II

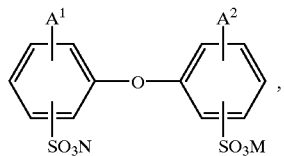

(II)

where $A^1$ and $A^2$ are hydrogen or $C_4$–$C_{24}$-alkyl and are not both hydrogen, and N and M can be alkali metal ions and/or ammonium ions. In the formula II, $A^1$ and $A^2$ are preferably linear or branched alkyl radicals having from 6 to 18 carbon atoms or hydrogen, and in particular having 6, 12 or 16 carbon atoms, where $A^1$ and $A^2$ are not both hydrogen. N and M are preferably sodium, potassium or ammonium ions, with sodium being particularly preferred. Particularly advantageous are compounds II in which N and M are sodium, $A^1$ is a branched alkyl radical having 12 carbon atoms and $A^2$ is hydrogen or $A^1$. Use is frequently made of industrial mixtures containing from 50 to 90% by weight of the mono-alkylated product, for example Dowfax® 2A1 (trademark of the Dow Chemical Company), Dowfax 3B2 and Dowfax 8390. In the process of the invention, the compounds II are preferably used as dispersant on their own and particularly preferably in admixture with ethoxylated fatty alcohols and/or oxoalcohols (degree of ethoxylation: from 3 to 50, alkyl radical: $C_8$ to $C_{36}$). The compounds II are generally known, eg. from U.S. Pat. No. 4,269,749 and are commercially available.

The amount of dispersant used is generally from 0.5 to 6, preferably from 1 to 3, % by weight based on the amount of the monomers to be free-radically polymerized.

Suitable free-radical polymerization initiators are all those which are able to trigger a free-radical aqueous emulsion polymerization. These can be either peroxides, eg. alkali metal peroxodisulfates, or azo compounds. Use is frequently made of combined systems composed of at least one organic reducing agent and at least one peroxide and/or hydroperoxide, eg. tert-butyl hydroperoxide and the sodium salt of hydroxymethanesulfinic acid or hydrogen peroxide and ascorbic acid, and often combined systems which additionally contain a small amount of a metal compound which is soluble in the polymerization medium and whose metallic component can occur in a plurality of oxidation states, eg. ascorbic acid/iron(II) sulfate/hydrogen peroxide, where use is frequently also made of the sodium salt of hydroxymethanesulfinic acid, sodium sulfite, sodium hydrogen sulfite or sodium disulfite in place of ascorbic acid and tert-butyl hydroperoxide or alkali metal peroxodisulfates and/or ammonium peroxodisulfate in place of hydrogen peroxide. In place of a water-soluble iron(II) salt, use is frequently made of a combination of water-soluble Fe/V salts. The amount of the free-radical initiator systems used, based on the total amount of the monomers to be polymerized, is preferably from 0.1 to 2% by weight.

Of course, it is possible to influence the molecular weight by the concomitant use of molecular weight regulators such as mercaptans, eg. mercaptoethanol or thioglycolic esters, in the polymerization.

Polymerization pressure and polymerization temperature are of rather subordinate importance. In general, the polymerization is carried out at from room temperature to 100° C., preferably at from 50 to 95° C. The use of increased or reduced pressure is also possible, so that the polymerization temperature can also exceed 100° C. and can be up to 130° C. Readily volatile monomers such as ethylene, butadiene or vinyl chloride are preferably polymerized under increased pressure.

The free-radical aqueous emulsion polymerization for preparing the polymers P is preferably carried out by the feed stream addition process, ie. the major part of the monomers is continuously fed into the polymerization vessel at a rate corresponding to the rate of polymerization. The monomers are here preferably fed in as an emulsion, ie. an aqueous emulsion is formed from the total amount of the monomers to be polymerized, part of the water and part of the emulsifiers to be used, and this emulsion is continuously fed into the polymerization vessel at a rate corresponding to the monomer consumption (emulsion feed stream process). The way in which the free-radical initiator system is added to the polymerization vessel during the course of the free-radical aqueous emulsion polymerization is of subordinate importance to the success of the process of the invention. The initiator system can either all be initially charged into the polymerization vessel, or can be added continuously or stepwise at a rate corresponding to the rate at which it is consumed in the course of the free-radical aqueous emulsion polymerization. This depends specifically, in a manner known per se to those skilled in the art, both on the chemical nature of the initiator system and on the polymerization temperature.

The emulsion feed stream addition process is preferably carried out as follows. The polymerization vessel is initially charged with from 10 to 50% by weight of the total water to be used and from 0 to 50% by weight of the total dispersant to be used and the mixture is heated to the desired polymerization temperature.

A monomer emulsion is produced from the total amount of the monomers to be polymerized, the remaining amount of the dispersant and from 10 to 50% by weight of the total water to be used, and this emulsion forms a feed stream 1. The total amount of the polymerization initiator to be used is dissolved in from 1 to 20% by weight of the total water to be used. This solution forms a feed stream 2. Subsequently, from 1 to 10% by weight of feed stream 1 and from 1 to 10% by weight of feedstream 2 are added to the initial charge heated to the polymerization temperature and the resulting mixture is polymerized to a conversion of the monomers present of at least 80 mol %, preferably at least 90 mol %. The remaining amounts of the feed streams 1 and 2 are subsequently fed in continuously and physically separately with maintenance of the polymerization (in accordance with the polymerization conversion). If desired, further post-polymerization is subsequently carried out to complete the polymerization conversion. Very particularly preferably, the emulsion polymerization process is carried out in such a way that the initial charge additionally includes at least a part amount of the total amount of all the monomers of the general formula I to be polymerized in and only the remainder of the total amount of the monomers of the general formula I is present in the emulsion feed stream 1.

This initially charged amount of the monomers of the general formula I is advantageously from 5 to 100% by weight, preferably from 20 to 90% by weight and particularly preferably from 40 to 80% by weight, of the total amount of all the monomers of the general formula I to be polymerized in. The aqueous polymer dispersions to be used according to the invention which result from this procedure have an increased stability of the dispersed distribution of the polymer particles.

Furthermore, the flow resistance of the resulting aqueous polymer dispersion can be influenced simply and in a targeted manner over a wide range by the amount of monomers of the general formula I polymerized in and their distribution between initial charge and feed stream (a low proportion in the initial charge gives a lower flow resistance, an increased proportion in the initial charge correspondingly an increased flow resistance). For a solids content of the resulting aqueous polymer dispersion of 50% by volume, it is possible, for example, to set dynamic viscosities of from 20 to 1000 mPas (measured at a shear rate of 250 sec$^{-1}$ and 25° C. and 1 atm in accordance with DIN 53019) in a targeted manner.

The preferred polymerization initiator in the feed stream process is sodium peroxodisulfate and the polymerization temperature is preferably from 75 to 95° C. The polymerization is generally carried out under an inert gas atmosphere.

The number average molecular weight of the polymer P of the invention is usually from $2 \cdot 10^4$ to $2 \cdot 10^6$, preferably from $2.5 \cdot 10^5$ to $7.5 \cdot 10^5$. A readily obtainable measure of the mean molecular weight of the polymer P of the invention is its K value. The K value is a relative viscosity number which is determined by a method similar to DIN 53 726. It comprises the flow rate of a pure solvent relative to the flow rate of a solution of the polymer in this solvent and characterizes the mean molecular weight of the polymer. A high x value corresponds to a high mean molecular weight (cf. Cellulosechemie, Vol. 13 (1932), pp. 58–64, and Kirk-Othmer, Encyclopedia of Chemical Technology, Vol. 23, pp. 967–968).

The K value of the polymers P of the invention (23° C., 0.5% strength by weight solution in dimethylformamide (DMF)) is advantageously from 50 to 110, preferably from 60 to 100, p preferably from 75 to 95 and very particularly preferably from 80 to 90.

The polymer P of the invention is preferably prepared by the method of free radical aqueous emulsion polymerization at a pH of the aqueous dispersion medium <6. The pH of the aqueous dispersion medium is subsequently adjusted to from 6 to 10, preferably from 7 to 9, by addition of alkali metal hydroxide and/or ammonia. The aqueous polymer dispersions having a pH of the aqueous dispersion medium increased to this extent are particularly suitable for the preservation process of the invention. The solids content of the aqueous polymer dispersions to be used for the purposes of the process of the invention is usually from 20 to 60% by weight.

The aqueous dispersion of the polymer P can, for the purposes of the process of the invention, be used for preserving a mineral molding either on its own or provided with additives. Such additives can be: an aromatic ketone such as benzophenone as described in DE-A-38 27 975 as photoinitiator for the purpose of effecting crosslinking under the action of electromagnetic radiation, or a water-soluble dihydrazide, as described in DE-A 39 01 073, if the polymer P comprises, in polymerized form, monomers containing carbonyl groups.

The aqueous dispersion of the polymer P is particularly frequently used for preserving purposes in pigmented form. Examples of pigments are titanium dioxide and iron oxide.

Other suitable pigments (often also described as fillers) are, for example, barium sulfate, talc, mica, calcium carbonate, dolomite, quartz flour and mixtures thereof. Pigments can be added to the aqueous dispersion of the polymer P to just below the critical pigment volume concentration. Their proportion by volume, based on the total composition to be used according to the invention, is preferably from 15 to 45% by volume. Furthermore aqueous dispersion of the polymer P for the process of the invention can have added to it other auxiliaries such as wetting agents, fungicides, antifoaming agents, thickeners, antifreezes and spreading promoters in the amounts which are customary per se.

The amount of the aqueous polymer formulation applied for preservation purposes is usually from 100 to 700 g/m$^2$ (calculated wet). It can be applied in a manner known per se by spraying, spreading with a spatula, blade coating, rolling or casting. It is significant that the process of the invention can be used both for cured and for freshly prepared ("green") mineral moldings. It is particularly suitable for preserving mineral moldings containing cement as mineral binder (known as concrete bricks). Particularly advantageously, it prevents efflorescence on concrete roofing tiles. The latter are produced from cement mortars whose consistency makes the final shaping possible. Their curing is usually carried out at from 40 to 100° C. The concrete roofing tiles are, after shaping (eg. by means of extrusion) but generally before curing, surface-coated with an aqueous composition to be used according to the invention and then stored for from 6 to 12 hours in curing chambers in which the abovementioned temperatures usually prevail. During this time they harden and the coating composition forms a preservative film. Occasionally, a further application of the coating composition is carried out after curing, with subsequent drying.

EXAMPLES

A) Preparation of aqueous polymer dispersions of polymers P according to the invention (ID) as well as comparative dispersions (CD)

CD1: A polymerization vessel having a volume capacity of 31 was charged with 570 g of water and 4 g of a 35% strength by weight aqueous solution of the sulfuric acid monoester of ethoxylated (degree of ethoxylation–25) nonylphenol (=emulsifier solution 1) and the mixture was heated to 80° C.

In a first, stirred, feed vessel a monomer emulsion of

| | |
|---|---|
| 590 g | of water |
| 56 g | of emulsifier solution 1, |
| 560 g | of styrene and |
| 840 g | of n-butyl acrylate | was prepared as feed stream 1.

In a second feed vessel, a feed stream 2 was prepared from

| | |
|---|---|
| 6 g | of sodium peroxodisulfate and |
| 200 g | of water. |

To the initial charge at 80° C., 80 g of feed stream 1 was added all at once and then 12 g of feed stream 2 was added all at once, and the mixture was polymerized for 15 minutes at 80° C. Subsequently, the remaining amounts of the feed streams 1 and 2 were, commencing simultaneously, fed continuously over a period of 3 hours (via physically separated inlets) to the polymerization vessel while maintaining the 80° C. Subsequently, post-polymerization was carried out for a further 1 hour at 80° C. The mixture was then cooled to 250° C. and the pH of the aqueous dispersion medium was raised to 8 by means of 25% strength by weight aqueous ammonia solution. 0.5% by weight, based on the dispersed polymer, of benzophenone was then stirred in at 60° C.

The solids content of the resulting aqueous polymer dispersion CD1 was 50.1% by weight. The K value of the dispersed polymer (23° C., 0.5% strength by weight in DMF) was 64 and the $T_g$ of the film was 30° C.

ID1: Like CD1, but the initial charge additionally contained 5.6 g of a 50% strength by weight aqueous solution of 2-acrylamido-2-methylpropanesulfonic acid and the feed stream 1 additionally contained 22.4 g of a 50% strength by weight aqueous solution of 2-acrylamido-2-methylpropanesulfonic acid (AMPS).

The solids content of the resulting aqueous polymer dispersion ID1 was 50.3% by weight. The K value of the disperesed polymer (23° C., 0.5% strength by weight in DMF) was 61 and the $T_g$ of the film was 4° C.

CD2: Like CD1, but the polymerization temperature was 90° C. In addition, no benzophenone was stirred in and the initial charge and feed streams had the following compositions:

| | |
|---|---|
| Initial charge: | 570 g of water and |
| | 3 g of a 45% strength by weight aqueous solution of the emulsifier present in Dowfax 2A1 (= emulsifier solution 2); |

The solids content of the resulting aqueous polymer dispersion CD2 was 50.4% by weight. The K value of the dispersed polymer (23° C., 0.5% strength by weight in DMF) was 66 and the $T_g$ of the film was +6° C.

ID2: Like CD2, but the 35 g of acrylic acid in feed stream 1 were replaced by the same weight of 2-acrylamido-2-methyl-propanesulfonic acid. The solids content of the resulting aqueous polymer dispersion was 50.2% by weight. The K value of the dispersed polymer (23° C., 0.05% strength by weight in DMF) was 71 and the $T_g$ of the film was +5° C.

CD3: Like CD2, but the initial charge and feed streams had the following compositions:

| | |
|---|---|
| Initial charge: | 580 g of water and |
| | 3 g of emulsifier solution 2; |
| Feed stream 1: | 603 g of water, |
| | 44 g of emulsifier solution 2, |
| | 420 g of methyl methacrylate, |
| | 490 g of n-butyl methacrylate, |
| | 490 g of n-butyl acrylate and |
| | 35 g of acrylic acid; |

The solids content of the resulting aqueous polymer dispersion CD3 was 50.2% by weight. The K value of the dispersed polymer (23° C., 0.5% strength by weight in DMF) was 82 and the $T_g$ of the film was 11° C.

ID3: Like CD3, but the 35 g of acrylic acid in feed stream 1 were replaced by 28 g of AMPS. In addition, 7 g of AMPS were added to the initial charge. The solids content of the resulting aqueous polymer dispersion was 50.2% by weight. The K value of the dispersed polymer (23° C., 0.5% strength by weight in DMF) was 79 and $T_g$ of the film was 11° C.

CD4: Like CD2, but the polymerization temperature was 85° C. and the pH was increased using a 20% strength by weight aqueous KOH solution in place of ammonia. In addition, the initial charge and feed streams had the following compositions:

| | |
|---|---|
| Initial charge: | 549 g of water, |
| | 5 g of a 30% strength by weight aqueous solution of the sodium salt of the sulfuric acid monoester of ethoxylated (degree of ethoxylation: 20) $C_{13}$-oxoalcohol (saturated) (= emulsifier solution 3) and |
| | 7 g of a 20% strength by weight aqueous solution of an ethoxylated (degree of ethoxylation: 30) $C_{13}/C_{15}$-oxoalcohol (saturated) mixture (= emulsifier solution 4); |

The solids content of the resulting aqueous polymer dispersion CD4 was 52.5% by weight. The K value of the dispersed polymer (23° C., 0.5% strength by weight in DMF) was 63 and the $T_g$ of the film was 17° C.

ID4: Like CD4, but the 28 g of 50% strength by weight aqueous solution of vinylsulfonic acid were replaced by 28 g of 50% strength by weight aqueous AMPS solution. The solids content of the resulting aqueous polymer dispersion was 52.3% by weight. The K value of the dispersed polymer (23° C., 0.5% strength by weight in DMF) was 77 and the $T_g$ of the film was 19° C.

ID5: Like CD2, but the initial charge and feed streams had the following compositions:

| | |
|---|---|
| Initial charge: | 556 g of water, |
| | 11 g of a 25% strength by weight aqueous solution of the ammonium salt of the phosphoric acid monoester of an ethoxylated (degree of ethoxylation: 15) mixture of $C_{13}/C_{15}$-oxoalcohols (= emulsifier solution 5), |
| | 7 g of a 40% strength by weight aqueous solution of ethoxylated (degree of ethoxylation: 50) nonylphenol (= emulsifier solution 6) and |

|  |  |
|---|---|
|  | 11 g of a 50% strength by weight aqueous solution of the sodium salt of 2-acrylamido-2-methylpropanesulfonic acid; |
| Feed stream 1: | 575 g of water, |
|  | 73 g of emulsifier solution 5, |
|  | 11 g of emulsifier solution 6, |
|  | 700 g of methyl methacrylate, |
|  | 700 g of 2-ethylhexyl acrylate and |
|  | 31 g of a 50% strength by weight aqueous solution of the sodium salt of 2-acrylamido-2-methylpropanesulfonic acid; |
| Feed stream 2: | 6 g of sodium peroxodisulfate and |
|  | 200 g of water. |

The solids content of the resulting aqueous polymer dispersion ID5 was 50.3% by weight. The K value of the dispersed polymer (23° C., 0.5% strength by weight in DMF) was 83 and the $T_g$ of the film was 3° C.

ID6: Like CD2, but the initial charge and feed streams had the following compositions:

|  |  |
|---|---|
| Initial charge: | 502 g of water, |
|  | 10 g of emulsifier solution and |
|  | 12 g of a 50% strength by weight aqueous solution of the sodium salt of 2-acrylamido-2-methylpropane-sulfonic acid; |
| Feed stream 1: | 523 g of water, |
|  | 56 g of emulsifier solution 2, |
|  | 780 g of methyl methacrylate, |
|  | 720 g of n-butyl acrylate, |
|  | 10 g of a 50% strength by weight aqueous solution of acrylamide and |
|  | 18 g of a 50% strength by weight aqueous solution of the sodium salt of 2-acrylamido-2-methylpropane-sulfonic acid; |
| Feed stream 2: | 7 g of sodium peroxodisulfate and |
|  | 200 g of water. |

The solids content of the resulting aqueous polymer dispersion ID6 was 54.2% by weight. The x value of the dispersed polymer (23° C., 0.5% strength by weight in DMF) was 93 and the $T_g$ of the film was 28° C.

ID7: Like CD2, but the polymerization temperature was 85° C. In addition, the initial charge and feed streams had the following compositions:

|  |  |
|---|---|
| Initial charge: | 534 g of water, |
|  | 9 g of emulsifier solution 2 and |
|  | 14 g of a 50% strength by weight aqueous solution of the sodium salt of 2-acrylamido-2-methylpropane-sulfonic acid; |
| Feed stream 1: | 552 g of water, |
|  | 37 g of emulsifier solution 2, |
|  | 15 g of a 28% strength by weight aqueous solution of the sodium salt of the sulfuric acid monoester of ethoxylated (degree of ethoxylation: 3) $C_{12}/C_{14}$-fatty alcohol (saturated) mixture (= emulsifier solution 7), |
|  | 742 g of methyl methacrylate, |
|  | 658 g of n-butyl acrylate, |
|  | 7 g of methacrylic acid and |
|  | 14 g of a 50% strength by weight aqueous solution of the sodium salt of 2-acrylamido-2-methylpropane-sulfonic acid; |
| Feed stream 2: | 3 g of sodium peroxodisulfate and |
|  | 200 g of water. |

The solids content of the resulting aqueous polymer dispersion ID7 was 54.4% by weight. The K value of the dispersed polymer (23° C., 0.5% strength by weight in DMF) was 97 and the $T_g$ of the film was 26° C.

ID8: Like CD2, but the polymerization temperature was 85° C. and the pH was increased using 20% strength by weight aqueous sodium hydroxide solution. In addition, the initial charge and feed streams had the following compositions:

|  |  |
|---|---|
| Initial charge: | 471 g of water, |
|  | 7 g of emulsifier solution 1, |
|  | 6 g of emulsifier solution 4 and |
|  | 14 g of a 50% strength by weight aqueous solution of AMPS; |
| Feed stream 1: | 486 g of water, |
|  | 29 g of emulsifier solution 1, |
|  | 13 g of emulsifier solution 4, |
|  | 675 g of methyl methacrylate, |
|  | 575 g of n-butyl acrylate, |
|  | 13 g of methacrylic acid and |
|  | 13 g of a 50% strength by weight aqueous solution of acrylamide; |
| Feed stream 2: | 5 g of sodium peroxodisulfate and |
|  | 190 g of water. |

The solids content of the resulting aqueous polymer dispersion ID8 was 52.6% by weight. The K value of the dispersed polymer (23° C., 0.5% strength by weight in DMF) was 87 and the $T_g$ of the film was 29° C.

ID9: Like CD2, but the initial charge and feed streams had the following compositions:

|  |  |
|---|---|
| Initial charge | 568 g of water |
| Feed stream 1: | 587 g of water, |
|  | 56 g of emulsifier solution 3, |
|  | 700 g of styrene, |
|  | 700 g of n-butyl acrylate, and |
|  | 84 g of a 50% strength by weight aqueous solution of the ammonium salt of 2-acrylamido-2-methylpropanesulfonic acid; |
| Feed stream 2: | 7 g of sodium peroxodisulfate and |
|  | 200 g of water. |

The solids content of the resulting aqueous polymer dispersion ID9 was 50.1% by weight. The K value of the dispersed polymer (23° C., 0.5% strength by weight in DMF) was 60 and the $T_g$ of the film was 16° C.

ID10: Like CD2, but the initial charge and feed streams had the following compositions:

|  |  |
|---|---|
| Initial charge: | 573 g of water, |
|  | 10 g of emulsifier solution 2 and |
|  | 15 g of a 50% strength by weight aqueous solution of the ammonium salt of 2-acrylamido-2-methylpropanesulfonic acid; |

-continued

| | |
|---|---|
| Feed stream 1: | 594 g of water, |
| | 57 g of emulsifier solution 2, |
| | 780 g of methyl methacrylate, |
| | 720 g of n-butyl acrylate, |
| | 9 g of a 50% strength by weight aqueous solution of acrylamide and |
| | 15 g of a 50% strength by weight aqueous solution of the ammonium salt of 2-acrylamido-2-methylpropane sulfonic acid; |
| Feed stream 2: | 8 g of sodium peroxodisulfate and |
| | 300 g of water. |

The solids content of the resulting aqueous polymer dispersion ID10 was 50.3% by weight. The K value of the dispersed polymer (23° C., 0.5% strength by weight in DMF) was 84 and the $T_g$ of the film was 21° C.

ID11: Like CD2, but the polymerization temperature was 80° C. and the initial charge and feed streams had the following compositions:

| | |
|---|---|
| Initial charge: | 564 g of water and |
| | 20 g of a 50% strength by weight aqueous solution of the ammonium salt of 2-acrylamido-2-methylpropanesulfonic acid; |
| Feed stream 1: | 583 g of water, |
| | 93 g of emulsifier solution 3, |
| | 650 g of vinyl acetate, |
| | 750 g of n-butyl acrylate, |
| | 14 g of a 50% strength by weight aqueous acrylamide solution and |
| | 8 g of a 50% strength by weight aqueous solution of the ammonium salt of 2-acrylamido-2-methylpropanesulfonic acid; |
| Feed stream 2: | 6 g of sodium peroxodisulfate and |
| | 200 g of water. |

The solids content of the resulting aqueous polymer dispersion ID11 was 50.2% by weight. The K value of the dispersed polymer (23° C., 0.5% strength by weight in DMF) was 78 and the $T_g$ of the film was −5° C.

ID12: Like CD2, but the initial charge and feed streams had the following compositions:

| | |
|---|---|
| Initial charge: | 581 g of water, |
| | 5 g of emulsifier solution 3, and |
| | 10 g of potassium salt of 3-sulfopropyl acrylate; |
| Feed stream 1: | 601 g of water, |
| | 65 g of emulsifier solution 3, |
| | 1120 g of n-butyl methacrylate, |
| | 280 g of n-butyl acrylate, |
| | 21 g of acrylic acid, |
| | 14 g of a 50% strength by weight aqueous acrylamide solution and |
| | 4 g of the potassium salt of 3-sulfopropyl acrylate; |
| Feed stream 2: | 4 g of sodium peroxodisulfate and |
| | 200 g of water. |

The solids content of the resulting aqueous polymer dispersion ID12 was 50.5% by weight. The K value of the dispersed polymer (23° C., 0.5% strength by weight in DMF) was 81 and the $T_g$ of the film was 12° C.

ID13: Like CD2, but the initial charge and feed streams had the following compositions:

| | |
|---|---|
| Initial charge: | 593 g of water, |
| | 12 g of emulsifier solution 2, |
| | 17 g of emulsifier solution 4 and |
| | 6 g of the potassium salt of 3-sulfopropyl methacrylate; |
| Feed stream 1: | 613 g of water, |
| | 35 g of emulsifier solution 2, |
| | 700 g of methyl methacrylate, |
| | 700 g of n-butyl acrylate, |
| | 14 g of methacrylic acid, |
| | 15 g of the potassium salt of 3-sulfopropyl methacrylate; |
| Feed stream 2: | 4 g of sodium peroxodisulfate and |
| | 200 g of water. |

The solids content of the resulting aqueous polymer dispersion ID13 was 50.5% by weight. The K value of the dispersed polymer (23° C., 0.5% strength by weight in DMF) was 82 and the $T_g$ of the film was 16° C.

ID14: Like CD2, but the initial charge and feed streams had the following compositions:

| | |
|---|---|
| Initial charge: | 573 g of water, |
| | 7 g of the potassium salt of 3-sulfopropyl methacrylate; |
| Feed stream 1: | 592 g of water, |
| | 84 g of emulsifier solution 5, |
| | 728 g of methyl methacrylate, |
| | 672 g of 2-ethylhexyl acrylate and |
| | 28 g of the potassium salt of 3-sulfopropyl methacrylate; |
| Feed stream 2: | 4 g of sodium peroxodisulfate and |
| | 200 g of water. |

The solids content of the resulting aqueous polymer dispersion ID14 was 50.5% by weight. The K value of the dispersed polymer (23° C., 0.5% strength by weight in DMF) was 82 and the $T_g$ of the film was 8° C.

B) Coating test on concrete moldings

The aqueous polymer dispersions from A) were diluted with water to a polymer content of 40% by weight. 0.5% by weight, based on the aqueous polymer dispersion, of a commercial antifoaming agent was subsequently added.

Using the coating composition obtained, "green" concrete moldings were uniformly sprayed on one of the two faces using a spray gun (about 2 bar spray pressure), until a wet amount of 120 g/m² had been applied.

The "green" concrete moldings were produced as flat plates of the dimensions 30×20×1.8 cm by extrusion of a mortar comprising sand (particle size up to 0.3 mm) and cement (weight ratio 1:3) and also water at a water/cement weight ratio of 0.4, with the sand having been colored black using iron oxide pigment. The coated concrete moldings were cured by drying in a humidity-controlled oven for 30 minutes at 60° C. and 50% relative atmospheric humidity. Subsequently, those concrete moldings whose coatings contained benzophenone were irradiated for 10 minutes under ambient conditions using a 10 W UV lamp. The concrete moldings whose coatings contained no benzophenone were similarly stored for 10 minutes under ambient conditions. The concrete moldings were then again dried in the controlled-humidity oven for a further 2.5 hours at 60° C. and 50% relative atmospheric humidity and subsequently for a further 3 hours at 60° C. and 95% relative atmospheric humidity. The concrete moldings were subsequently stored for 24 hours under ambient conditions. The coated side of the plate was then exposed for 7 days to water vapor having a temperature of 60° C. After subsequent drying for 24 hours under ambient conditions, the coating was assessed visually. The results are given in the following table in the form of numerical values as a function of the polymer dispersion from A) used in each case. The numerical values correspond to the following degrees of observed efflorescence:

```
0 = no efflorescence
1 = very few efflorescences
2 = few efflorescences
3 = numerous efflorescences
4 = many efflorescences
5 = very many efflorescences
```

TABLE

| Aqueous polymer dispersion used | Efflorescence assessment |
|---|---|
| CD1 | 3 |
| ID1 | 0 |
| CD2 | 3 |
| ID2 | 1 |
| CD3 | 5 |
| ID3 | 0 |
| CD4 | 5 |
| ID4 | 1 |
| ID5 | 0 |
| ID6 | 0 |
| ID7 | 0 |
| ID8 | 0 |
| ID9 | 2 |
| ID10 | 0 |
| ID11 | 0 |
| ID12 | 0 |
| ID13 | 0 |
| ID14 | 0 |

We claim:

1. An aqueous polymer dispersion whose resultant film has a static glass transition temperature of from >+20 to +50° C. and whose dispersed polymer P comprises from 90 to 99.5% by weight of at least one monomer from the group encompassing esters of acrylic acid with alkanols having from 1 to 8 carbon atoms, esters of methacrylic acid with alkanols having from 1 to 8 carbon atoms, styrene, α-methylstyrene, o-chlorostyrene and vinyltoluenes, from 0.5 to 5% by weight of one or more monomers from the group encompassing acrylic acid, methacrylic acid, itaconic acid, the alkali metal salts of these, the ammonium salts of these, acrylamide and methacrylamide and from 0 to 5% by weight of at least one monomer of the general formula I

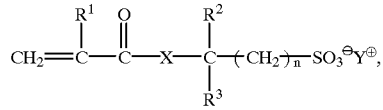

(I)

where the variables have the following meanings:

n is 0 to 2, $R^1$, $R^2$, $R^3$ are, independently of one another, hydrogen or methyl, X is oxygen or imino (NH) and Y is hydrogen, alkali metal or ammonium, polymerized into it in free-radically polymerized form.

2. The aqueous polymer dispersion of claim 1, wherein said ester of acrylic acid is methyl, ethyl, n-butyl, iso-butyl, tert-butyl or 2-ethylhexyl acrylate.

3. The aqueous polymer dispersion of claim 1, wherein said ester of methacrylic acid is methyl, ethyl, n-butyl, iso-butyl, tert-butyl or 2-ethylhexyl methacrylate.

* * * * *